United States Patent [19]
Barratt et al.

[11] 3,710,556
[45] Jan. 16, 1973

[54] PROTECTED PRESSURE RELEASE VALVE

[75] Inventors: Robert O. Barratt, Parsippany, N.J. 07054; John M. Connell, Mountain Lakes, N.J. 07046

[73] Assignee: Foster Wheeler Corporation, Livingston, N.J.

[22] Filed: Nov. 20, 1970

[21] Appl. No.: 91,421

[52] U.S. Cl. ............... 55/210, 55/310, 55/456, 55/466, 122/34, 122/488
[51] Int. Cl. ............................................. B01d 45/12
[58] Field of Search ............... 55/210, 309–314, 55/417, 456, 457, 466; 122/34, 488–491

[56] References Cited

UNITED STATES PATENTS

| 1,684,020 | 9/1928 | Hawley | 55/455 |
| 2,361,394 | 10/1944 | Freeman et al | 55/417 |
| 2,732,028 | 1/1956 | Coulter | 122/491 |
| 2,763,245 | 9/1956 | Place | 122/488 |
| 2,993,480 | 7/1961 | Huet | 122/34 |
| 3,481,120 | 12/1969 | Lustenader | 55/457 |
| 630,023 | 8/1899 | Baker | 55/456 |
| 3,279,438 | 10/1966 | Baker | 122/488 |

*Primary Examiner*—Bernard Nozick
*Attorney*—John Maier, III, Marvin A. Naigur and John E. Wilson

[57] ABSTRACT

Means to release excessive pressure in a pressure vessel containing gas in which denser material is entrained. A separator is placed between a pressure release valve and the pressure vessel to separate the entrained material from the escaping gas and thereby protect the valve from damage.

2 Claims, 1 Drawing Figure

PATENTED JAN 16 1973 3,710,556
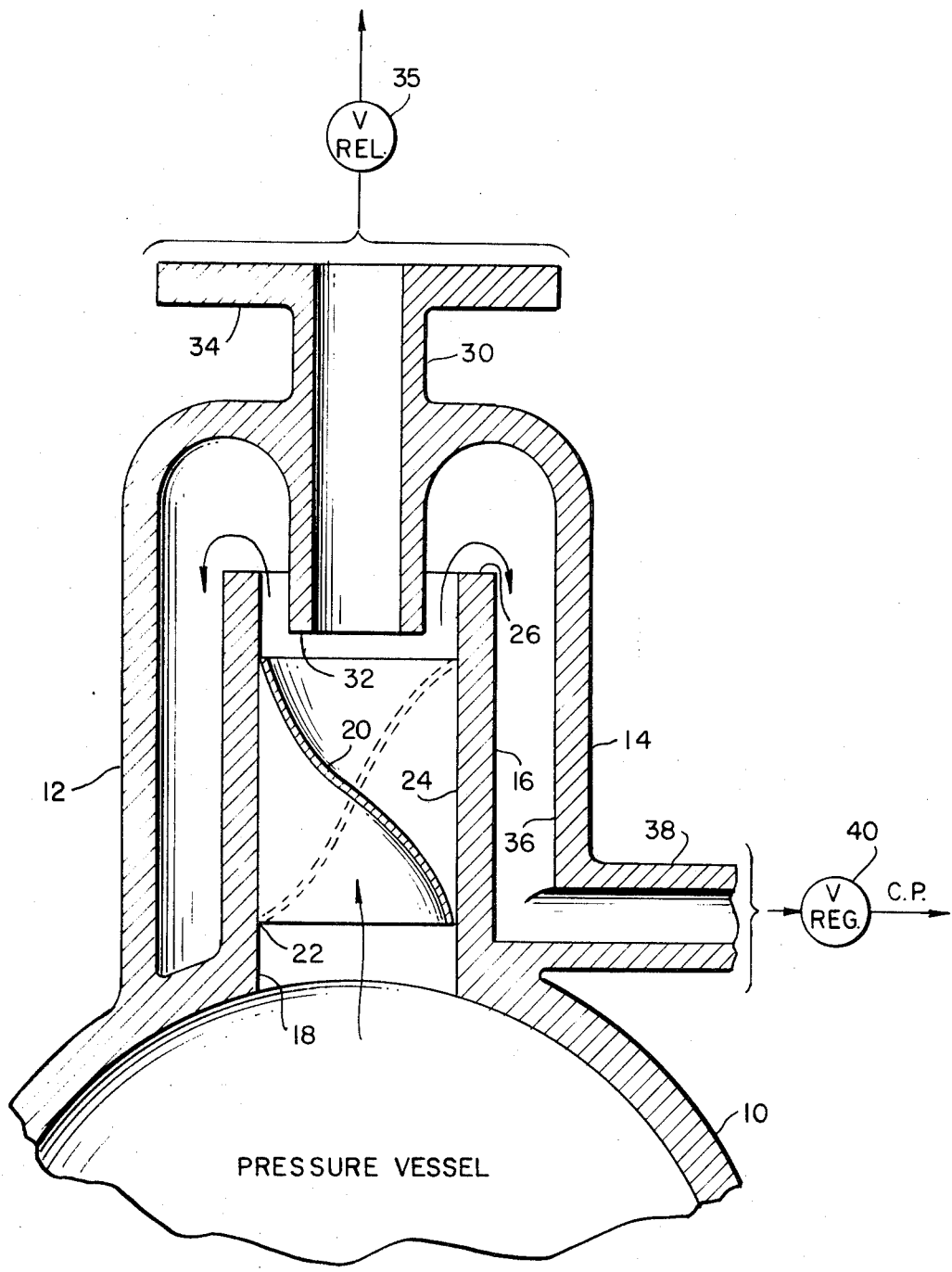
INVENTORS
ROBERT O. BARRATT
BY JOHN M. CONNELL
John E. Wilson
ATTORNEY

PROTECTED PRESSURE RELEASE VALVE

BACKGROUND OF THE INVENTION

There are situations where a pressure release valve is used to protect a pressure vessel containing a mixture of gas and a denser substance, i.e., a liquid or solid. An example is found in nuclear power plants where heat is exchanged from the nuclear fuel to liquid sodium which, in turn, exchanges heat to other liquid sodium which is used to generate steam. In the event the heat transfer surface separating the liquid sodium from the steam-water mixture should fail, it will be extremely necessary to isolate the liquid sodium system from the water system to eliminate, as much as possible, the violent sodium water reaction. This would be done by immediately closing valves, preventing flow of water and sodium into the heat exchanger to prevent further contact between the sodium and the water-steam mixture. Further, the water and steam in the heat exchanger must be removed as quickly as possible. This is accomplished by the operation of one or more pressure release valves, which are commonly called safety valves. A safety valve, however, may malfunction because water slugs entrained in the escaping steam are likely to damage it. It the valve should become damaged so that it would not operate, unnecessary damage or even an explosion could result.

SUMMARY OF THE INVENTION

A pressure vessel containing a mixture of gas and a denser substance is protected by a pressure release valve and a separator positioned between the valve and the vessel to prevent the relatively dense substance from passing through the valve when it operates.

BRIEF DESCRIPTION OF THE DRAWING

The drawing is a view, partly in section, of an embodiment of the present invention.

DETAILED DESCRIPTION OF THE DRAWING

The drawing shows a pressure vessel 10 which is suitable for containing a mixture of gas, such as steam, and a denser substance, such as water entrained in the steam. Connected to the vessel is a separator 12 which has an upwardly projecting shell 14. The shell 14 is essentially cylindrical in configuration and is closed at its bottom by the vessel 10. Within the shell 14 is a sleeve 16 which is generally cylindrical, coaxial with the shell 14, and which at its lower end communicates directly with the pressure vessel 10 through an opening 18. One or more spiral vanes 20 are positioned within the sleeve 16. The peripheries 22 of the vanes 20 engage against the inner wall 24 of the sleeve 16. The vanes do not extend to the top 26 of the sleeve 16.

A collar 30 is integral with and extends through the top portion of the shell 14 and into the upper portion of the sleeve 16 to provide an orifice concentric with the longitudinal axis of said vanes 20. The lower end 32 of the collar 30 is positioned slightly above the top of the vanes 20 and the outside diameter of the collar 30 is less than the inside diameter of the sleeve 16 so that an annular space is present between the sleeve 16 and collar 30. The top of the collar 30 has a flange 34 which is suitable for connection with the pressure release valve 35.

The outside surface of the sleeve 16 and the inside surface of the shell 14 defines between them an annular chamber 36. A conduit 38 communicates with the bottom of the chamber 36 and with an outlet valve 40, the function of which will be explained presently.

In operation, when pressure within the pressure vessel 10 is excessive and above a predetermined value, the pressure release valve 35 will operate to allow steam to escape upwardly through the sleeve 16, the collar 30 and the valve itself. Water entrained in the steam will not pass through the valve 35 because the spiral vanes 20 will cause it to be thrown outwardly against the inside wall 24 of the sleeve 16 because of the centrifugal force imparted to the water by the spiral vanes 20. The water will pass outside of the collar 30 until it impinges against the top of the shell 14 to fall downwardly into the chamber 36. The water is then drained off by operating the outlet valve 40.

The foregoing describes a preferred embodiment of the present invention. It will be readily apparent to one of ordinary skill in the art that other embodiments are possible within the scope of the present invention as defined by the following claims.

What is claimed is:

1. A component for protecting a pressure vessel containing a gas in which is entrained a denser substance comprising:
   a sleeve, one end of which is connected with said vessel;
   a spiral vane positioned within said sleeve, the periphery of said vane engaging against the inside wall of said sleeve;
   a collar of a smaller diameter than said sleeve concentric and in connection with said sleeve, said collar being axially spaced from said spiral vane;
   a pressure release valve connected with said collar to open at a predetermined pressure to allow said gas to escape through said sleeve, collar and valve, said denser substance will be rotated when passing through said sleeve by said vane and thus forced by centrifugal force to the outside of said collar and thereby separate from said gas;
   a shell connected to and encircling said collar defining an annular chamber extending around said collar axially spaced from said sleeve so that said denser substance will proceed into said chamber after leaving said sleeve; and
   an outlet valve connected with and operable to drain said chamber.

2. The component defined in claim 1 wherein said shell has a portion extending coaxial with and about said sleeve, said portion extending from said collar away from said pressure release valve and being connected with said sleeve to define an annular passage for receiving said denser substance from said annular chamber; and
   a conduit connected to said annular passage and to said outlet valve.

* * * * *